United States Patent
Matsuo et al.

(10) Patent No.: US 10,053,147 B2
(45) Date of Patent: Aug. 21, 2018

(54) STEERING CONTROL APPARATUS

(71) Applicant: JTEKT CORPORATION, Osaka-shi, Osaka (JP)

(72) Inventors: Shigeto Matsuo, Kako-gun (JP); Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/434,405

(22) Filed: Feb. 16, 2017

(65) Prior Publication Data
US 2017/0247051 A1 Aug. 31, 2017

(30) Foreign Application Priority Data
Feb. 26, 2016 (JP) .................................. 2016-035889

(51) Int. Cl.
| | | |
|---|---|---|
| *B62D 6/08* | (2006.01) | |
| *B62D 5/04* | (2006.01) | |
| *B62D 6/00* | (2006.01) | |
| *B62D 3/12* | (2006.01) | |

(52) U.S. Cl.
CPC ............. *B62D 6/08* (2013.01); *B62D 5/0409* (2013.01); *B62D 5/0463* (2013.01); *B62D 3/12* (2013.01)

(58) Field of Classification Search
CPC ...... B62D 6/08; B62D 5/0409; B62D 5/0463; B62D 3/12
USPC ...................................... 701/42, 43; 180/446
See application file for complete search history.

(56) References Cited

U.S. PATENT DOCUMENTS

| | | | |
|---|---|---|---|
| 5,448,482 A | 9/1995 | Yamamoto et al. | |
| 2009/0198417 A1 | 8/2009 | Limpibunterng et al. | |
| 2009/0267551 A1* | 10/2009 | Shibata ................ | B62D 5/0484 318/400.21 |
| 2013/0233639 A1* | 9/2013 | Kodato ................ | B62D 5/0463 180/446 |

(Continued)

FOREIGN PATENT DOCUMENTS

| | | |
|---|---|---|
| EP | 2851266 A1 | 3/2015 |
| JP | 2014-040178 A | 3/2014 |

OTHER PUBLICATIONS

Nov. 28, 2017 extended Search Report issued in European Patent Application No. 17157235.7.

*Primary Examiner* — Gertrude Arthur Jeanglaude
(74) *Attorney, Agent, or Firm* — Oliff PLC

(57) ABSTRACT

A steered-angle command value calculation circuit calculates a steered-angle command value by adding a steering torque to a first assist component that is a sum of a basic assist control amount, a hysteresis control amount and a damping control amount. A steered-angle feedback control circuit calculates a second assist component by angle feedback control based on the steered-angle command value. A compensation control circuit generates the hysteresis control amount and the damping control amount based on a determination flag generated by a hand release determination circuit and indicating whether or not the steering state corresponds to a hand release state. The hand release determination circuit determines whether or not the steering state corresponds to the hand release state based on signs of a steering angle calculated by a steering-angle calculation circuit, a steering angular velocity that is a differential value of the steering angle, and a steering angle acceleration.

14 Claims, 12 Drawing Sheets

(56) References Cited

U.S. PATENT DOCUMENTS

2013/0253773 A1* 9/2013 Itamoto .................. B62D 5/049
  701/43
2014/0058628 A1 2/2014 Tamaizumi

* cited by examiner

STEERING CONTROL APPARATUS

INCORPORATION BY REFERENCE

The disclosure of Japanese Patent Application No. 2016-035889 filed on Feb. 26, 2016 including the specification, drawings and abstract, is incorporated herein by reference in its entirety.

BACKGROUND OF THE INVENTION

1. Field of the Invention

The invention relates to a steering control apparatus.

2. Description of the Related Art

Electric power steering systems (EPS) have been known which assist a driver's steering operation by applying power of a motor to a steering mechanism in a vehicle. For example, an EPS described in Japanese Patent Application Publication No. 2014-40178 (JP 2014-40178 A) performs feedback control on a motor current in order to generate an appropriate assist force corresponding to a steering torque. That is, the EPS adjusts a voltage applied to the motor so as to reduce a difference between an actual current value for the motor and an assist current command value calculated based on the steering torque.

For improved operability of a steering wheel, some recent EPSs perform damping control so as to adjust a return speed of a steering wheel according to a steering angular velocity or to suppress a rapid change in steering angle. Other recent EPSs perform hysteresis control in which an assist force having a hysteresis characteristic is applied in response to a change in steering angle. A steering control apparatus in the EPS performs control such that a driver has a more preferable steering feeling by compensating for a command value for the steering angle using a compensation value calculated based on the hysteresis control and the damping control.

In the conventional damping control, the amount of damping control is calculated according to the value of the steering angular velocity. Thus, a similar compensation calculation is executed for a turn-back state where the driver is turning back the steering wheel and for a hand release state where the driver is not holding the steering wheel. In this regard, the preferable steering feeling for the driver varies between the turn-back state and the hand release state. Thus, even with the damping control, the appropriate adjustment of the steering feeling is difficult.

Compensation control such as the hysteresis control similarly has a compensation characteristic varying between the turn-back state and the hand release state, making the appropriate adjustment of the steering feeling difficult. Consequently, for appropriate execution of the compensation control, a method has been desired which allows appropriate detection of the driver's steering wheel operating states including the driver's steering wheel holding state.

SUMMARY OF THE INVENTION

An object of the invention is to provide a steering control apparatus that more adequately detects a driver's operating state.

A steering control apparatus in an aspect of the invention controls a power transmission apparatus that applies power to a steering mechanism using a motor as a driving source, based on a command value serving as a target value for the power. The steering control apparatus includes a basic assist control circuit that calculates a basic component of the command value based on a steering torque applied to a steering shaft of the steering mechanism, a compensation control circuit that calculates a first compensation component for the basic component based on a steering angle that is a rotation angle of the steering shaft of the steering mechanism or a rotation angle of a rotating element that is convertible into the steering angle, and a determination circuit that determines whether or not the driver's steering state corresponds to a hand release state based on the steering angle and a steering angular velocity that is an amount of variation in the rotation angle per unit time.

In this configuration, the determination circuit can more adequately determine whether or not the driver is not holding a steering wheel, based on the steering angle and the steering angular velocity. That is, the use of the steering angle and the steering angular velocity enables determination of whether energy of the steering wheel and the like is acting in a converging direction or in a diverging direction, allowing more adequate determination of whether or not the steering state corresponds to the hand release state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
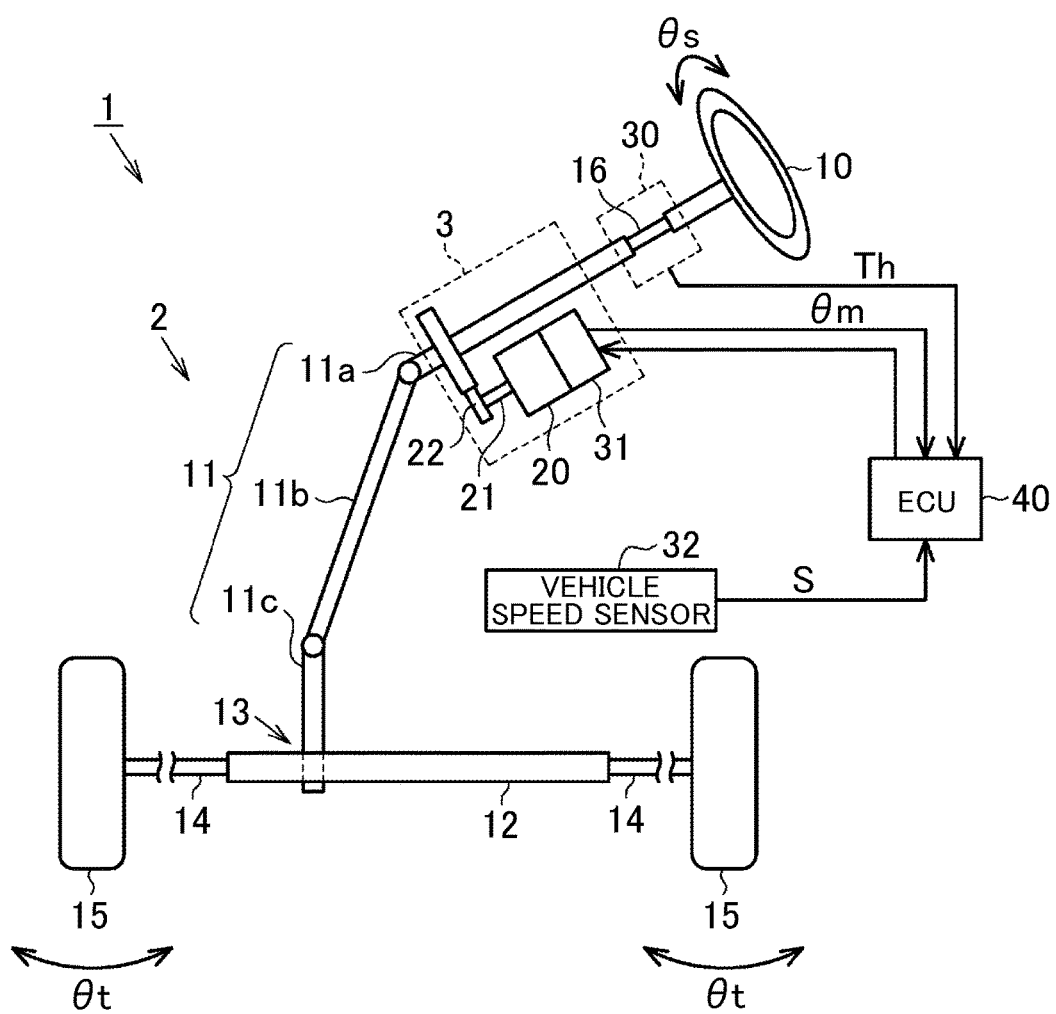
FIG. 1 is a schematic diagram of a configuration of an electric power steering system (EPS)

A first embodiment will be described below in which a steering control apparatus in the invention is applied to a steering system. As depicted in FIG. 1, an EPS 1 includes a steering mechanism 2 that steers steered wheels 15 based on a driver's operation of a steering wheel 10, an assist mechanism 3 that assists the driver's steering operation, and an electronic control unit (ECU) 40 that controls the assist mechanism 3.

The steering mechanism 2 includes a steering wheel 10 and a steering shaft 11 that rotates integrally with the steering wheel 10. The steering shaft 11 has a column shaft 11a coupled to the steering wheel 10, an intermediate shaft 11b coupled to a lower end of the column shaft 11a, and a pinion shaft 11c coupled to a lower end of the intermediate shaft 11b. A lower end of the pinion shaft 11c is coupled via a rack-and-pinion mechanism 13 to a rack shaft 12 that is a steered shaft. Therefore, in the steering mechanism 2, a rotary motion of the steering shaft 11 is converted into an axial (a lateral direction in FIG. 1) reciprocating linear motion of the rack shaft 12 via the rack-and-pinion mechanism 13 including a pinion gear provided at a tip of the pinion shaft 11c and a rack provided on the rack shaft 12. The reciprocating linear motion is transmitted to the right and left steered wheels 15 via respective tie rods 14 coupled to the opposite ends of the rack shaft 12 to vary a steered angle θt of the steered wheels 15 and thus a traveling direction of a vehicle.

The assist mechanism 3 includes a motor 20 that applies an assist force to the steering shaft 11. A rotating shaft 21 of the motor 20 is coupled to the column shaft 11a via a reduction mechanism 22. The reduction mechanism 22 reduces a rotation speed transmitted from the motor 20 and transmits a rotational force with the reduced rotation speed to the column shaft 11a. That is, the rotational force of the motor 20 (motor torque) is applied to the steering shaft 11 as an assist force to assist the driver's steering operation. As the motor 20, for example, a three-phase brushless motor is adopted which rotates based on three-phase (U, V, W) driving power.

The ECU 40 controls the motor 20 based on detection results from various sensors provided in the vehicle. The sensors include, for example, a torque sensor 30, a rotation angle sensor 31, and a vehicle speed sensor 32. A torsion bar 16 is provided on the column shaft 11a. The torque sensor 30 is provided on the column shaft 11a. The rotation angle sensor 31 is provided on the motor 20. The torque sensor 30 detects a steering torque Th applied to the steering shaft 11 based on torsion occurring, as a result of the driver's steering operation, between a portion of the column shaft 11a located above the torsion bar 16 and a portion of the column shaft 11a located below the torsion bar 16. The rotation angle sensor 31 detects a rotation angle θm of the rotating shaft 21. The vehicle speed sensor 32 detects a vehicle speed S that is a traveling speed of the vehicle. The ECU 40 sets a target assist force based on outputs from the sensors and controls a current supplied to the motor 20 so as to make an actual assist force equal to the target assist force.

Figure 2:
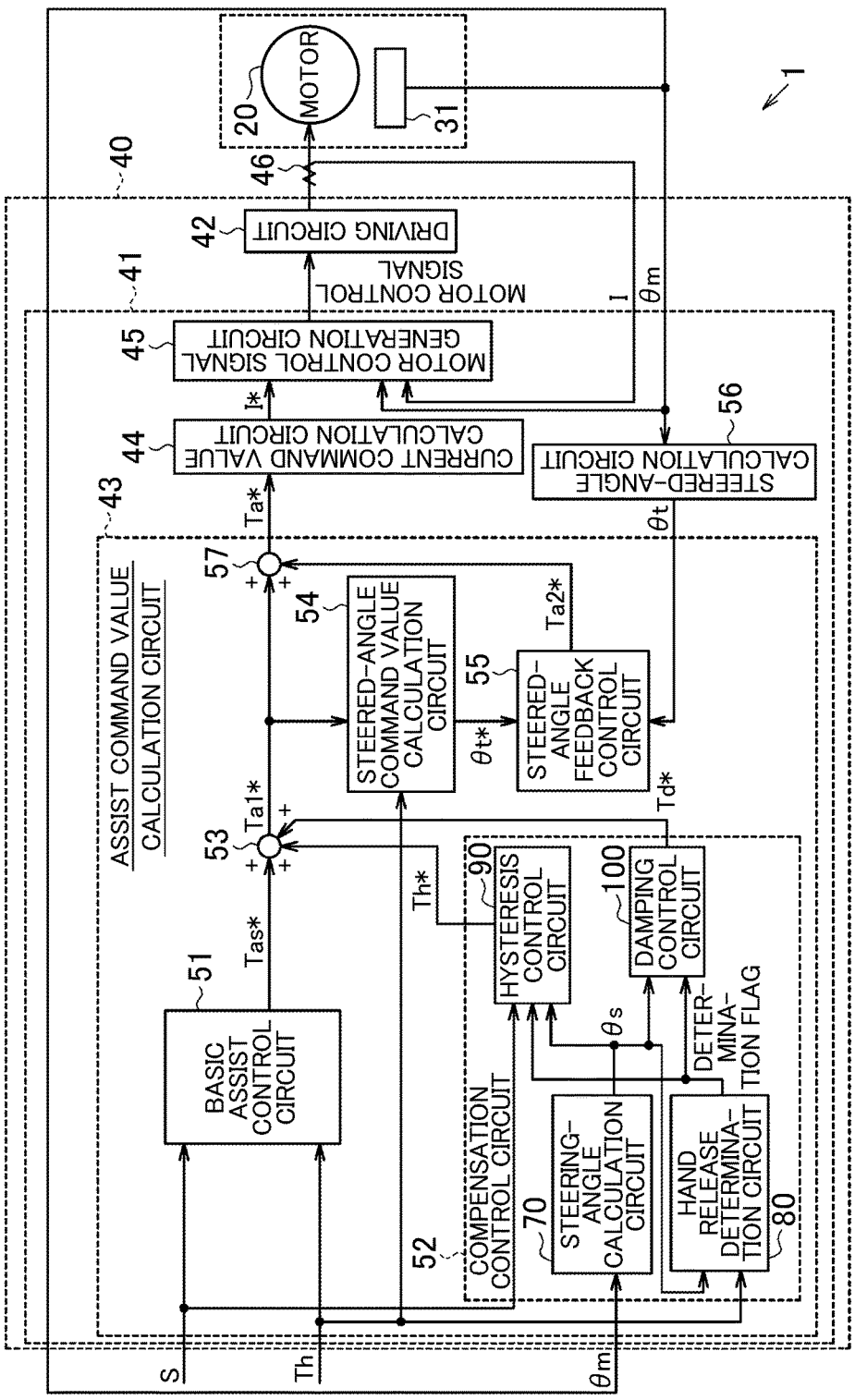
FIG. 2 is a block diagram for control in the EPS in the present embodiment.

Now, a configuration of the ECU 40 will be described in detail. As illustrated in FIG. 2, the ECU 40 includes a microcomputer 41 that generates a motor control signal and a driving circuit 42 that supplies driving power to the motor 20 based on the motor control signal.

Control blocks illustrated below are implemented by a program executed by the microcomputer 41. The microcomputer 41 generates the motor control signal by detecting various state variables with a predetermined sampling period and executing calculation processing indicated in control blocks described below every predetermined periods.

Specifically, the microcomputer 41 includes an assist command value calculation circuit 43 that calculates an assist command value Ta* corresponding to an assist force to be generated by the motor 20, that is, a target assist force (motive force), based on a steering torque Th and a vehicle speed S, and a current command value calculation circuit 44 that calculates a current command value I* corresponding to the assist command value Ta*. The microcomputer 41 has a motor control signal generation circuit 45 that generates a motor control signal output to the driving circuit 42 by performing current feedback control based on a current deviation dI so as to allow an actual current value I to follow the current command value I*.

The current command value calculation circuit 44 calculates a q-axis current command value for a d/q coordinate system as the current command value I* (a d-axis current command value is zero). The motor control signal generation circuit 45 loads, in addition to the current command value I*, three phase current values (Iu, Iv, Iw) detected as the actual current value I by the current sensor 46 and a rotation angle θm detected by the rotation angle sensor 31. The current command value calculation circuit 44 maps the phase current values to d/q coordinates serving as rotary coordinates that depend on the rotation angle θm, and performs current feedback control in the d/q coordinate system to generate a corresponding motor control signal.

Now, the assist command value calculation circuit will be described in detail. The assist command value calculation circuit 43 includes a basic assist control circuit 51 that calculates a basic assist control amount Tas* as a basic component of the assist command value Ta*. The assist command value calculation circuit 43 has a compensation control circuit 52 that calculates a hysteresis control amount Th* and a damping control amount Td* that are first compensation components for the basic assist control amount Tas*. The assist command value calculation circuit 43 has an adder 53, a steered-angle command value calculation circuit 54, and a steered-angle feedback control circuit 55.

Figure 3:
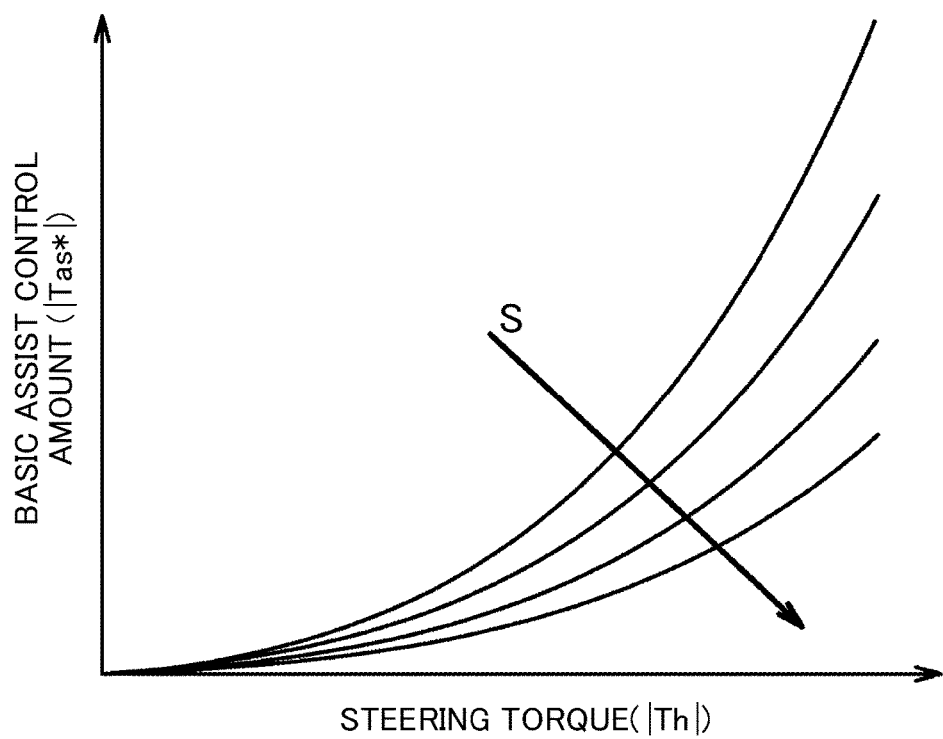
FIG. 3 is a diagram generally illustrating a basic assist control calculation.

As illustrated in FIG. 3, the basic assist control circuit 51 calculates the basic assist control amount Tas* to have an absolute value increasing as the absolute value of an input steering torque Th increases and the vehicle speed S decreases.

The adder 53 calculates a first assist component Ta1* by adding together the basic assist control amount Tas* calculated by the basic assist control circuit 51 and various compensation amounts (the hysteresis control amount Th* and the damping control amount Td*) calculated by the compensation control circuit 52.

The steered-angle command value calculation circuit 54 loads the steering torque Th in addition to the first assist component Ta1*. The steered-angle command value calculation circuit 54 calculates a steered-angle command value θt* based on the first assist component Ta1* and the steering torque Th. The steered-angle command value θt* corresponds to a target value for the steered angle θt.

Figure 4:
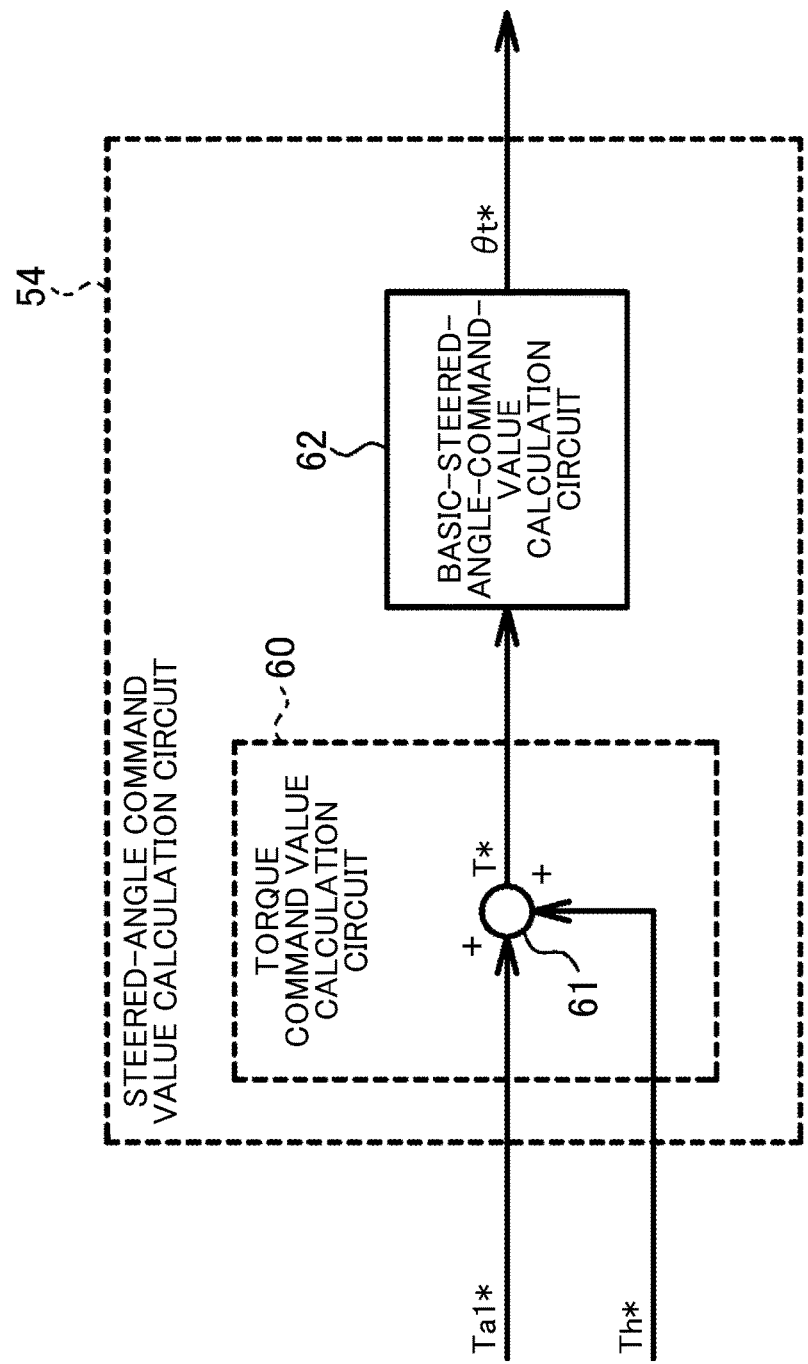
FIG. 4 is a schematic diagram of a configuration of a steered-angle command value calculation circuit.

As illustrated in FIG. 4, the steered-angle command value calculation circuit 54 loads the first assist component Ta1* and the steering torque Th. When the sum of the first assist component Ta1* and the steering torque Th is a torque command value T*, the steered-angle command value calculation circuit 54 has an ideal model that models calculation of a basic steered-angle command value θts* corresponding to the torque command value T*.

The steered-angle command value calculation circuit 54 has a torque command value calculation circuit 60 and a basic-steered-angle-command-value calculation circuit 62. The torque command value calculation circuit 60 calculates the torque command value T* to correspond to an input torque transmitted to the steering shaft 11 based on the first assist component Ta1* and the steering torque Th. The torque command value calculation circuit 60 is provided with an adder 61 that calculates the torque command value T* by adding the first assist component Ta1* and the steering torque Th together.

Based on the torque command value T*, the basic-steered-angle-command-value calculation circuit 62 calculates the steered-angle command value θt* that is a rotation angle command value for the steered angle θt of the steered wheels 15. The basic-steered-angle-command-value calculation circuit 62 calculates the steered-angle command value θt* based on an ideal model (input-rotation angle model) for the steering shaft 11, which rotates in conjunction with the input torque indicated in the torque command value T*. The input-rotation angle model is expressed by a spring term based on the rotation angle of the steering shaft 11, a viscosity term based on the rotation angle speed of the steering shaft 11, and an inertia term based on a value resulting from subtraction, from the input torque (torque command value T*), of a spring component and a viscosity component that are control outputs of the spring term and the viscosity term. The basic-steered-angle-command-value calculation circuit 62 calculates various compensation values based on command values in the above-described dimensions (angle, speed, and angular velocity), and calculates the steered-angle command value θt* compensated for based on the compensation values.

As illustrated in FIG. 2, the microcomputer 41 is provided with a steered-angle calculation circuit 56 that calculates the steered angle θt based on the rotation angle θm. As depicted in FIG. 1, the motor 20 is mechanically coupled to the steering shaft 11 (column shaft 11a) via a reduction mechanism 22, and thus, the rotation angle θm is correlated with the rotation angle (steering angle θs) of the steering shaft 11. Therefore, the rotation angle θm is also correlated with the steered angle θt. Thus, as illustrated in FIG. 2, the steered-angle calculation circuit 56 can calculate the actual steered angle θt of the steered wheels 15 based on the rotation angle θm. The steered-angle calculation circuit 56 outputs the calculated steered angle θt to the steered-angle feedback control circuit 55.

In order to allow the steered angle θt to follow the steered-angle command value θt*, the steered-angle feedback control circuit 55 calculates a second assist component Ta2* that is a second compensation component by executing steered-angle feedback control based on a deviation between the steered angle θt and the steered-angle command value θt*. The feedback control may be, for example, proportional-integral-differential control (PID control). The steered-angle feedback control circuit 55 outputs the calculated second assist component Ta2* to the adder 57.

The adder 57 calculates the assist command value Ta* by adding the first assist component Ta1* and the second assist component Ta2* together (Ta*=Ta1*+Ta2*). The compensation control circuit 52 has a steering-angle calculation circuit 70 that calculates the actual steering angle θs of the steering wheel 10 based on the rotation angle θm. The steering-angle calculation circuit 70 calculates the steering angle θs utilizing a relationship between the rotation angle θm and the rotation angle of the steering shaft 11 (see FIG. 1).

The compensation control circuit 52 has a hand release determination circuit 80 whether the steering wheel 10 is not in a hand release state where the driver is not holding the steering wheel 10 (the steering wheel 10 is in a hold state including turn-back steering) or the steering wheel 10 is in the hand release state. The hand release determination circuit 80 generates a determination flag indicating that the steering wheel 10 is in the hand release state or a determination flag indicating that the steering wheel 10 is not in the hand release state (the steering wheel 10 is in a steering state or in the hold state).

The compensation control circuit 52 has a hysteresis control circuit 90 that calculates the hysteresis control amount Th* based on the steering angle θs and a damping control circuit 100 that calculates the damping control amount Td* using the steering angle θs. The compensation control circuit 52 outputs the calculated hysteresis control amount Th* and damping control amount Td* to the adder 53. Each of the hysteresis control amount Th* and the damping control amount Td* have both positive and negative values. The adder 53 adds the hysteresis control amount Th* and the damping control amount Td* to the first assist component Ta1*. When the hysteresis control amount Th* and the damping control amount Td* are added to the first assist component Ta1*, the assist command value Ta* correspondingly changes, providing the driver with a steering feeling corresponding to the hysteresis control amount Th* and the damping control amount Td*.

The driver's steering feeling varies between an operation of turning the steering wheel 10 and an operation of turning back the steering wheel 10. Thus, the compensation control circuit 52 calculates the hysteresis control amount Th* taking into account both a compensation component corresponding to the turn-back operation and a compensation component corresponding to the turning operation.

Figure 5:
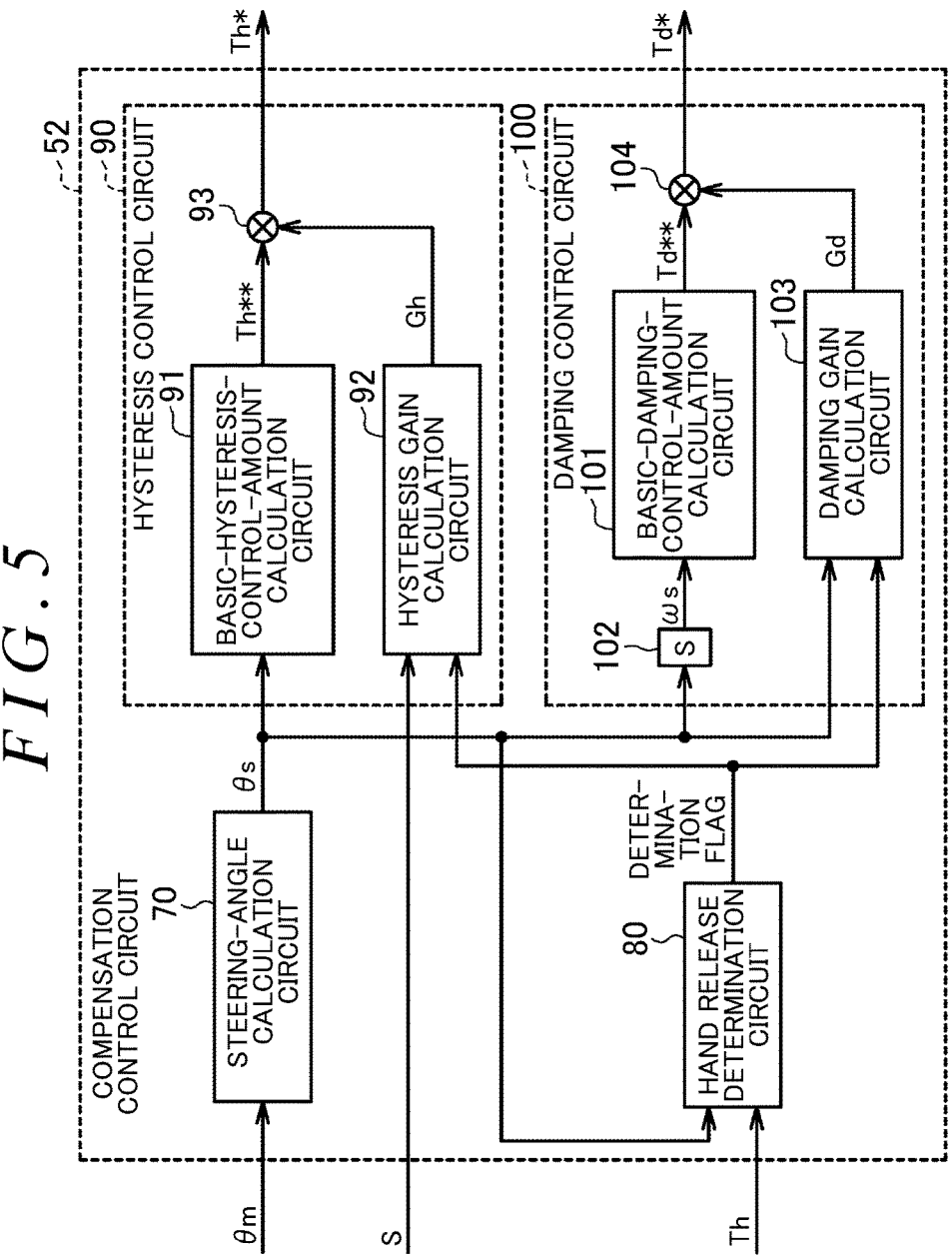
FIG. 5 is a schematic diagram of a configuration of a compensation control circuit.

As illustrated in FIG. 5, the hysteresis control circuit 90 loads each of the steering angle θs calculated by the steering-angle calculation circuit 70 and the vehicle speed S detected through the vehicle speed sensor. The hysteresis control circuit 90 performs hysteresis control so as to provide the driver with a steering feeling having a hysteresis characteristic in order to allow the driver to have a more preferable steering feeling during the steering operation. The hysteresis control circuit 90 has a basic-hysteresis-control-amount calculation circuit 91, a hysteresis gain calculation circuit 92, and a multiplier 93.

The basic-hysteresis-control-amount calculation circuit 91 calculates the basic hysteresis control amount Th** that is a basic component of the hysteresis control amount Th*, based on the steering angle θs. Specifically, the basic-hysteresis-control-amount calculation circuit 91 identifies a steering direction based on the steering angle θs calculated by the steering-angle calculation circuit 70. The basic-hysteresis-control-amount calculation circuit 91 determines whether the steering wheel 10 is in the turn-back state or in the turning state. The basic-hysteresis-control-amount calculation circuit 91 has a turn-back map corresponding to the turn-back operation of the steering wheel 10 and a turning map corresponding to the turning operation of the steering wheel 10. The turn-back map and the turning map represent the relationship between the steering angle θs and the basic hysteresis control amount Th. The basic-hysteresis-control-amount calculation circuit 91 uses the turn-back map to calculate the basic hysteresis control amount Th based on the steering angle θs when the steering wheel 10 is in the turn-back state. The basic-hysteresis-control-amount calculation circuit 91 uses the turning map to calculate the basic hysteresis control amount Th based on the steering angle θs when the steering wheel 10** is in the turning state.

Figure 6:
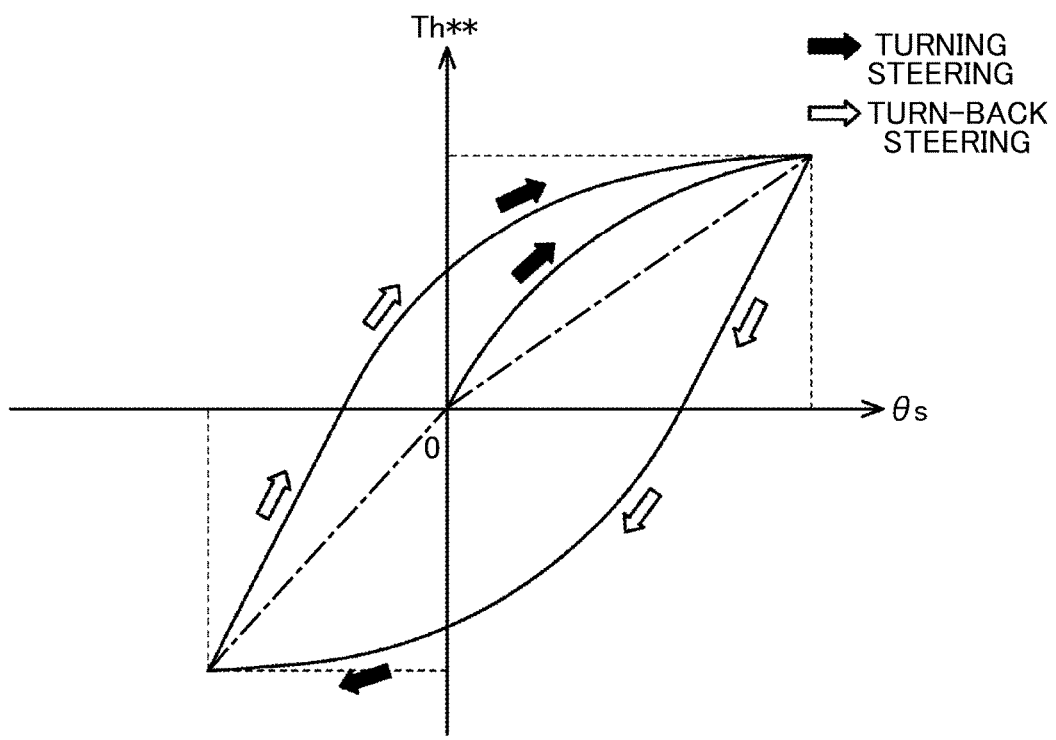
FIG. 6 is a graph illustrating a relationship between a steering angle and a hysteresis control amount.

As illustrated in a graph in FIG. 6, during turning steering with reference to the neutral position (θs=0) of the steering wheel 10, the basic hysteresis control amount Th shifts in the positive direction while the steering angle θs is positive value, and the basic hysteresis control amount Th shifts in the negative direction while the steering angle θs is negative value. In contrast, during turn-back steering, the basic hysteresis control amount Th shifts in the negative direction while the steering angle θs is positive value, and the basic hysteresis control amount Th shifts in the positive direction while the steering angle θs is negative value. To provide the driver with a smooth steering feeling, the basic hysteresis control amount Th** is calculated based in view of applying a steering reaction force having a hysteresis characteristic suitable for the driver's steering.

As illustrated in FIG. 5, the hysteresis gain calculation circuit 92 calculates a hysteresis gain Gh based on the vehicle speed S. The multiplier 93 calculates the hysteresis control amount Th* by multiplying the basic hysteresis control amount Th** by the hysteresis gain Gh. The hysteresis control amount Th* is a compensation component with a hysteresis characteristic with respect to variation in steering angle θs. The multiplier 93 outputs the calculated hysteresis control amount Th* to the adder 53.

The damping control circuit 100 performs damping control corresponding to a steering angular velocity ωs in order to suppress a rapid change in steering angle θs. The damping control adjusts a return speed of the steering wheel 10 and the steering feeling according to the steering angular velocity ωs to allow the driver to have a more preferable steering feeling during the steering operation. The damping control circuit 100 has a basic-damping-control-amount calculation circuit 101, a differentiator 102, a damping gain calculation circuit 103, and a multiplier 104.

The basic-damping-control-amount calculation circuit 101 calculates a basic damping control amount Td in a direction opposite to the direction in which the steering angular velocity ωs occurs, based on the steering angular velocity ωs, which is a value resulting from differentiation of the steering angle θs by the differentiator 102. The basic damping control amount Td is a basic component of the damping control amount Td*.

Figure 7:
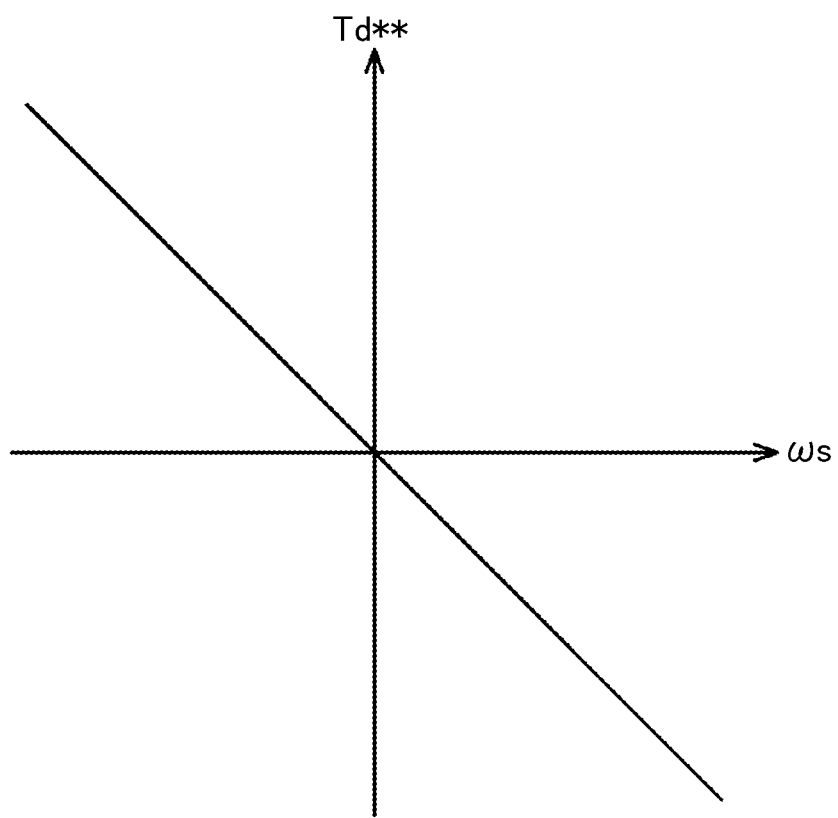
FIG. 7 is a graph illustrating a relationship between the steering angle and a damping control amount.

As illustrated in FIG. 7, the basic damping control amount Td increases in the negative direction as the steering angular velocity ωs increases in the positive direction and increases in the positive direction as the steering angular velocity ωs increases in the negative direction, with reference to an origin. That is, the basic damping control amount Td has a negative correlation with the steering angular velocity ωs.

As illustrated in FIG. 5, the damping gain calculation circuit 103 calculates a damping gain Gd based on the steering angle θs. The multiplier 104 calculates the damping control amount Td* by multiplying the basic damping control amount Td** by the damping gain Gd. The multiplier 104 outputs the calculated damping control amount Td* to the adder 53.

Calculation of the assist command value Ta* is executed by taking into account the second assist component Ta2* obtained by execution of the steered-angle feedback control, the hysteresis control amount Th* having a hysteresis characteristic for variation in the steering angle θs of the steering wheel 10, and the damping control amount Td* calculated in accordance with variation in the steering angular velocity ωs of the steering wheel 10.

Figure 8:
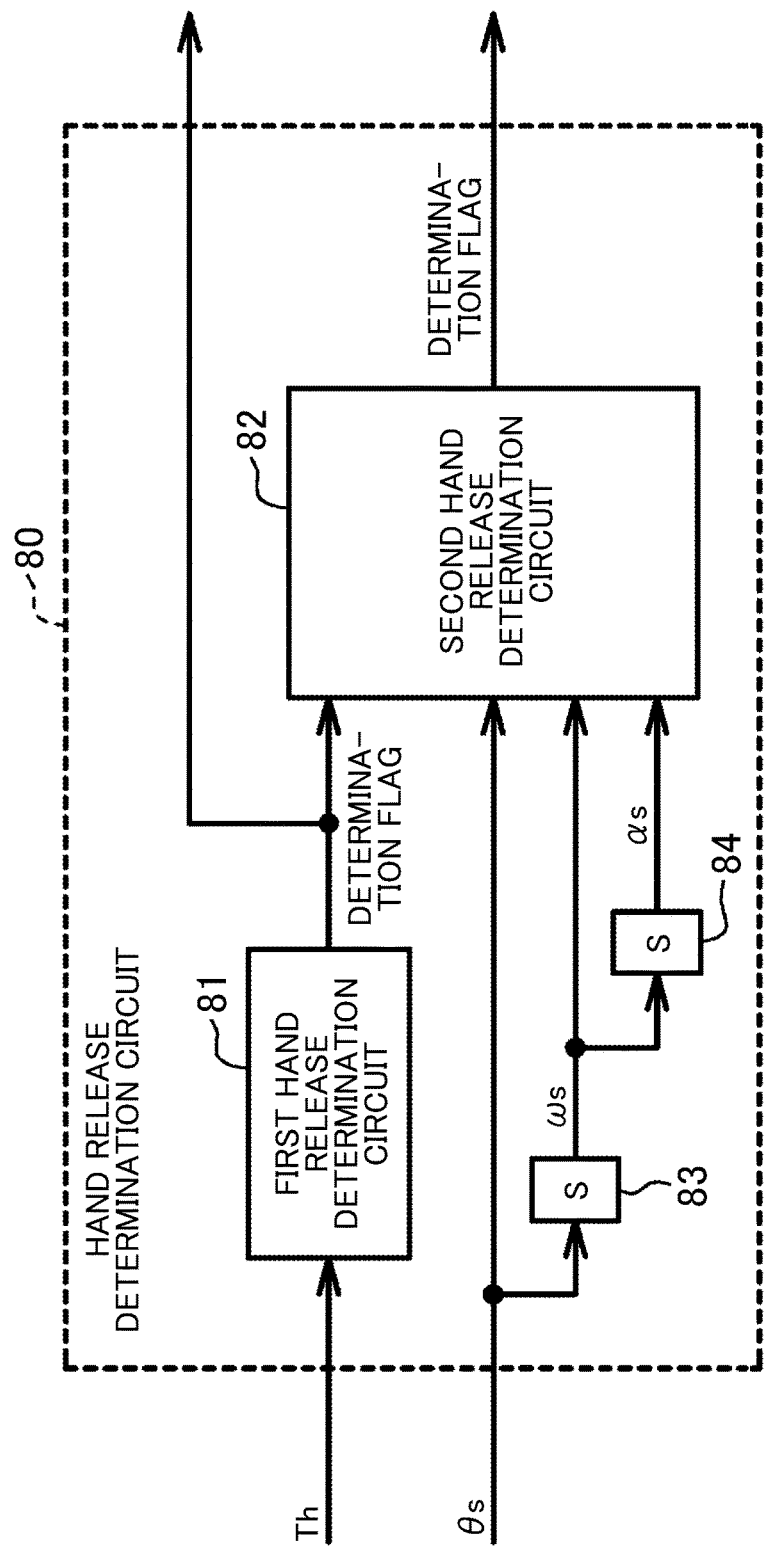
FIG. 8 is a schematic diagram of a hand release determination circuit.

Now, the hand release determination circuit 80 will be described. As illustrated in FIG. 8, the hand release determination circuit 80 loads the steering torque Th obtained from the torque sensor 30 and the steering angle θs obtained from the steering-angle calculation circuit 70. The hand release determination circuit 80 has a first hand release determination circuit 81 and a second hand release determination circuit 82. Using the steering torque Th, the first hand release determination circuit 81 determines whether or not the steering wheel 10 is in the hand release state, where the driver is not holding the steering wheel 10. Using the steering angle θs, the second hand release determination circuit 82 determines whether or not the steering wheel 10 is in the hand release state, where the driver is not holding the steering wheel 10.

The first hand release determination circuit 81 generates the determination flag indicating whether or not the steering wheel 10 is in the hand release state, based on whether or not the loaded steering torque Th is larger than a threshold. That is, the first hand release determination circuit 81 generates the determination flag indicating that the steering wheel 10 is not in the hand release state (the steering wheel 10 is in the steering state or in the hold state) when the steering torque Th is larger than the threshold. The first hand release determination circuit 81 generates the determination flag indicating that the steering wheel 10 is in the hand release state when the steering torque Th is smaller than the threshold. The threshold is preset, through experiments or the like, to such a steering torque as to make sure that the driver operates the steering wheel. The first hand release determination circuit 81 outputs the generated determination flag to the second hand release determination circuit 82, the hysteresis control circuit 90, and the damping control circuit 100.

Now, the steering torque Th will be described in detail. To be more exact, the steering torque Th is expressed by a steering torque (torsion bar torque Ts) detected due to torsion of the torsion bar 16 and a steering torque resulting from inertia and viscosity of the steering wheel 10 and the like. That is, the steering torque Th is expressed by Equation (1) below using a factor of inertia Jh determined by the inertia of the steering wheel 10 and the like, a viscosity coefficient Ch determined by the viscosity of the steering wheel 10 and the like, and a differential operator d.

$$Th=(Jh \cdot d^2+Ch \cdot d)\theta s+Ts \qquad (1)$$

The torsion bar torque Ts is expressed by Equation (2) below based on the torsion between the portion of the steering shaft 11 located above the torsion bar 16 (for example, the rotation angle θsw of the steering wheel 10) and the portion of the steering shaft 11 located below the torsion bar 16 (for example, a pinion angle θp of the pinion shaft 11c). A spring constant for the torsion bar 16 is a spring constant ks.

$$Ts=ks \cdot (\theta sw - \theta p) \qquad (2)$$

The first hand release determination circuit 81 determines whether or not the steering wheel 10 is in the hand release state, using the steering torque Th resulting from the above-described various factors.

The hand release determination circuit 80 has a differentiator 83 and a differentiator 84. The differentiator 83 calculates the steering angular velocity ωs, which is a differential value of the steering angle θs with respect to time, by differentiating the steering angle θs. The differentiator 84 calculates a steering angle acceleration as, which is a differential value of the steering angular velocity ωs with respect to time, by differentiating the steering angular velocity ωs. The differentiator 83 and the differentiator 84 may be calculators that calculate the amount of variation in the steering angle θs and the amount of variation in the steering angular velocity ωs, respectively.

Now, the second hand release determination circuit 82 will be described. The second hand release determination circuit 82 does not need to execute hand release determination upon loading, from the first hand release determination circuit 81, the determination flag indicating that the steering wheel 10 is in the hand release state. This is because the hysteresis control circuit 90 and the damping control circuit 100 may perform control using the determination flag output from the first hand release determination circuit 81 and indicating that the steering wheel 10 is in the hand release state. In this case, the second hand release determination circuit 82 may generate the determination flag by determining the hand release state or may not determine the hand release state or generate the determination flag.

The second hand release determination circuit 82 loads the determination flag generated by the first hand release determination circuit 81, the steering angle θs, the steering angular velocity ωs, and the steering angle acceleration αs. The second hand release determination circuit 82 performs the hand release determination based on the steering angle θs upon loading, from the first hand release determination circuit 81, the determination flag indicating that the steering wheel 10 is not in the hand release state.

Figure 9:
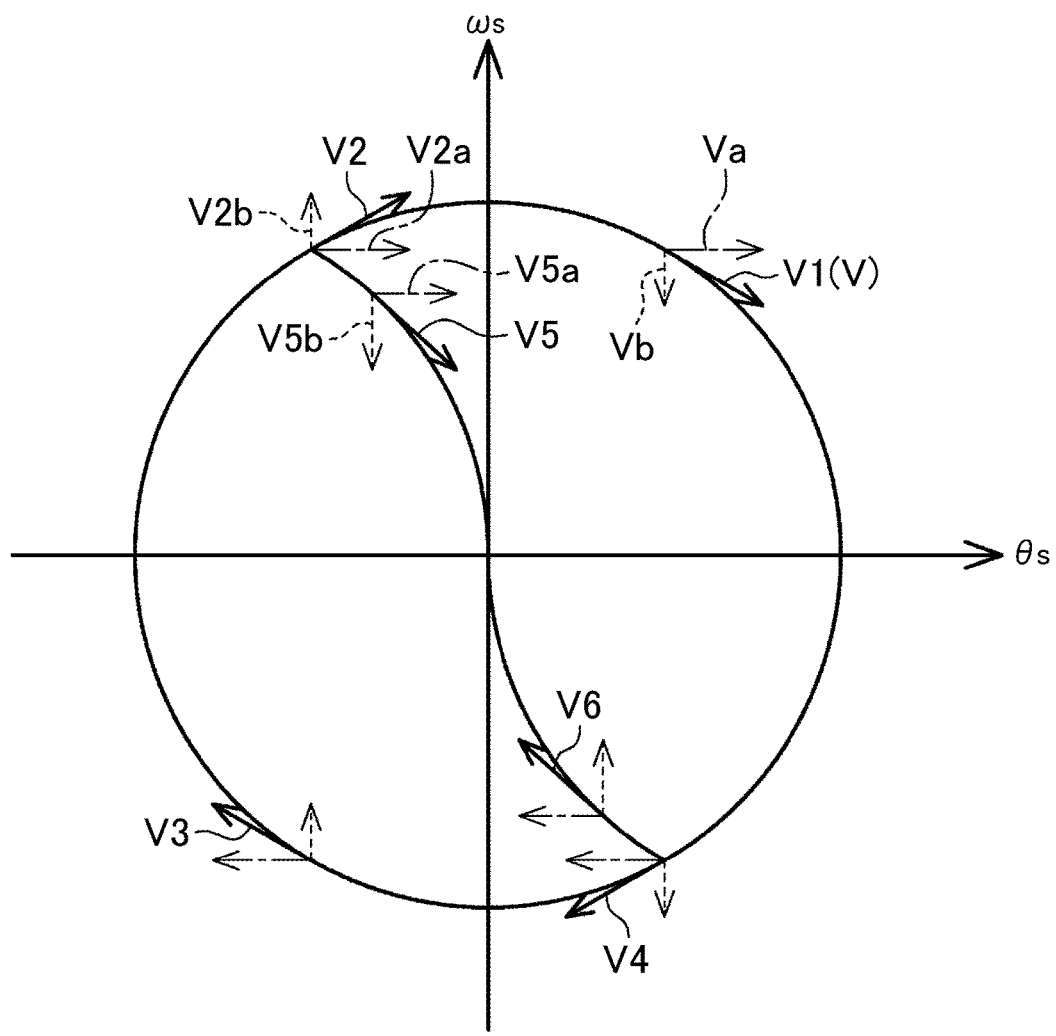
FIG. 9 is a conceptual drawing illustrating relationship between a hand release state, the steering angle, a steering angular velocity, and a steering angle acceleration.

As illustrated in FIG. 9, the second hand release determination circuit 82 determines the hand release state using the steering angle θs, the steering angular velocity ωs, and the steering angle acceleration αs. A graph in FIG. 9 shows the steering angle θs on the axis of abscissas and the steering angular velocity ωs on the axis of ordinate. In this case, a right steering direction refers to a direction in which the steering angle θs is positive. A left steering direction refers to a direction in which the steering angle θs is negative.

A vector V illustrated by a continuous line in FIG. 9 represents the steering angle θs, the steering angular velocity ωs, and the steering angle acceleration αs at a certain moment. The vector V is decomposed in the direction of the steering angle θs to obtain a component modified in a θ direction. The component is denoted by a long dashed short dashed line. The vector V that is a base for the component is denoted with an index a. The vector V is decomposed in the direction of the steering angular velocity ωs to obtain a component modified in a ω direction. The component is denoted by a dashed line. The vector V that is a base for the component is denoted with an index b. The origin of the vector V is expressed by the steering angle θs and the steering angular velocity ωs. A θs-direction component Va of the vector V represents the steering angular velocity ωs, which is the amount of variation in the steering angle θs per unit time. A ωs-direction component Vb of the vector V represents the steering angle acceleration αs, which is the amount of variation in the steering angular velocity ωs per unit time. For example, when the driver performs sine steering (steering with the steering angle θs varied like a sine wave at a constant pace), the origin of the vector V drawn at each moment is positioned on the identical circumference of a reference circle centered around the origin of the axis of ordinate and the axis of abscissas. The radius of the reference circle varies according to a force applied to the steering wheel 10 by the driver (the total amount of energy of the steering wheel 10 and the like). The total amount of energy (work) of the steering wheel 10 and the like is substantially constant because kinetic energy and potential energy have been exchanged with each other except in areas where the energy is lost due to friction or the like. Variation in the energy of the steering wheel 10 and the like can be determined based on the steering angle θs, the steering angular velocity ωs, and the steering angle acceleration αs indicated for the vector V.

First, the second hand release determination circuit 82 determines that the steering wheel 10 is not in the hand release state when the vector V is positioned in a first quadrant and a third quadrant (a vector 1 and a vector 3). That is, the second hand release determination circuit 82 determines that the steering wheel 10 is not in the hand release state when both the steering angle θs and the steering angular velocity ωs of the vector V are positive or negative. In this case, the steering angular velocity ωs, which is the rate of variation in the steering angle θs, increases in the positive direction as the steering angle θs increases in the positive direction (the steering wheel 10 is turned rightward). Thus, the driver is expected to be performing rightward turning steering (see a vector V1 in FIG. 9). The steering angular velocity ωs increases in the negative direction as the steering angle θs increases in the negative direction (the steering wheel 10 is turned leftward). Thus, the driver is expected to be performing leftward turning steering (see a vector V3 in FIG. 9).

Then, when the vector V is positioned in a second quadrant and a fourth quadrant (a vector V2 and a vector V4), the second hand release determination circuit 82 determines whether or not the steering wheel 10 is in the hand release state based on a θ-direction component and ω-direction component of the vector V. The second hand release determination circuit 82 determines that the steering wheel 10 is not in the hand release state (vectors V2, V4 in FIG. 9) when the θ-direction component (steering angular velocity ωs) and the ω-direction component (steering angle acceleration α s) have the same sign. In contrast, the second hand release determination circuit 82 determines that the steering wheel 10 is in the hand release state (vectors V5, V6 in FIG. 9) when the θ-direction component and the w-direction component of the vector V have opposite signs.

The vector V2 will be specifically described. The vector V2 is in the second quadrant, and thus, the steering angle θs is negative (the steering wheel 10 is in a leftward steered state). However, a θ-direction component V2a of the vector V2 is positive (rightward steering direction), and a ω-direction component V2b of the vector V2 is also positive. Thus, the driver is expected to be performing rightward turn-back steering on the steering wheel 10 that has been turned in the leftward steering direction as indicated by the steering angle θs.

The vector V4 is in the fourth quadrant, and thus, the steering angle θs is positive, indicating that the steering wheel 10 is in a rightward steered state. At this time, a θ-direction component V4a of the vector V4 is negative, and a ω-direction component V4b of the vector V4 is also negative. Thus, the driver is expected to be performing leftward turn-back steering on the steering wheel 10 that has been turned in the rightward steering direction as indicated by the steering angle θs.

In contrast, for a vector V5 and a vector V6, the second hand release determination circuit 82 determines that the steering wheel 10 is in the hand release state. For example, the vector V5 is in the second quadrant, and thus, the steering angle θs is negative, indicating that the steering wheel 10 has been turned leftward. At this time, a θ-direction component V5a of the vector V5 is positive, whereas a ω-direction component V5b of the vector V5 is negative. That is, the steering angular velocity ωs is positive, indicating that the steering wheel 10 is moving from the leftward steering state to the rightward steering state. However, the steering angle acceleration αs is negative, indicating that the steering angular velocity ωs is decreasing. This indicates a situation where the driver has released the steering wheel 10, which is returning to the neutral position thereof (where the steering angle θs is zero). As a result, the steering angular velocity ωs converges to zero toward the neutral position. For the vector V6, the steering wheel 10, which has been in the rightward steered state, is returning toward the neutral position of the steering wheel 10. Thus, the driver is expected not to be holding the steering wheel 10.

Now, a procedure for the hand release determination performed by the hand release determination circuit will be described. As illustrated in a flowchart in FIG. 10, the hand release determination circuit 80 (first hand release determination circuit 81) determines whether or not the steering torque Th is larger than the threshold (step S1).

When the steering torque Th is larger than the threshold (in step S1, YES), the hand release determination circuit 80 (first hand release determination circuit 81) determines that the steering wheel 10 is not in the hand release state (step S2). This is because the driver is expected to be steering or holding the steering wheel 10.

When the steering torque Th is smaller than the threshold (in step S1, NO), the hand release determination circuit 80 (second hand release determination circuit 82) determines whether or not the steering angle θs and the steering angular velocity ωs have the same sign (step S3).

When the steering angle θs and the steering angular velocity ωs have the same sign (in step S3, YES), the hand release determination circuit 80 (second hand release determination circuit 82) determines that the steering wheel 10 is not in the hand release state (step S4). This is because the steering wheel 10 is expected to be in the turning steering state.

When the steering angle θs and the steering angular velocity ωs have different signs (in step S3, NO), the hand release determination circuit 80 (second hand release determination circuit 82) determines whether or not the steering angular velocity ωs and the steering angle acceleration αs have the same sign (step S5).

When the steering angular velocity ωs and the steering angle acceleration αs have the same sign (in step S5, YES), the hand release determination circuit 80 (second hand release determination circuit 82) determines that the steering wheel 10 is not in the hand release state (step S6). This is because the steering wheel 10 is expected to be in the turn-back steering state.

When the steering angular velocity ωs and the steering angle acceleration αs have different signs (in step S5, NO), the hand release determination circuit 80 (second hand release determination circuit 82) determines that the steering wheel 10 is in the hand release state (step S7).

Based on the determination of whether or not the steering wheel 10 is in the hand release state, the hand release determination circuit 80 outputs the determination flag to the hysteresis control circuit 90 and the damping control circuit 100. Description will be given which relates to calculation of the hysteresis control amount Th* and the damping control amount Td* based on the determination flag resulting from the hand release determination.

The hysteresis control circuit 90 loads the determination flag resulting from the hand release determination. The hysteresis control circuit 90 performs hysteresis control taking the determination flag into account. That is, upon loading the determination flag, the hysteresis gain calculation circuit 92 of the hysteresis control circuit 90 calculates the hysteresis gain Gh to have a value varying depending on whether or not the determination flag is indicative of the hand release state. For example, upon receiving the determination flag indicative of the hand release state, the hysteresis gain calculation circuit 92 calculates the hysteresis gain Gh to have an absolute value smaller than the absolute value obtained in a normal state. In this case, decrement processing is executed so as to gradually vary (progressively reduce) the hysteresis gain Gh from the normal absolute value to a smaller absolute value.

The damping control circuit 100 loads the determination flag resulting from the hand release determination. The damping control circuit 100 performs damping control taking the determination flag into account. That is, upon loading the determination flag, the damping gain calculation circuit 103 of the damping control circuit 100 calculates the damping gain Gd to have a value varying depending on whether or not the determination flag is indicative of the hand release state. For example, upon receiving the determination flag indicative of the hand release state, the damping gain calculation circuit 103 calculates the damping gain Gd to have an absolute value larger than the absolute value obtained in the normal state. At this time, the damping gain calculation circuit 103 gradually varies (progressively increases) the damping gain Gd from a normal absolute value to a larger absolute value.

Then, the multiplier 93 calculates the hysteresis control amount Th* to have an absolute value smaller than the absolute value obtained in the normal state by multiplying the basic hysteresis control amount Th** by the hysteresis gain Gh with an absolute value smaller than the absolute value obtained in the normal state. The multiplier 104 also calculates the damping control amount Td* to have an absolute value larger than the absolute value obtained in the normal state by multiplying the basic damping control amount Td** by the damping gain Gd with an absolute value larger than the absolute value obtained in the normal state. Consequently, the first assist component Ta1* varies based on the hysteresis control amount Th* and the damping control amount Td*, which are calculated based on whether or not the steering wheel 10 is in the hand release state.

Effects of the present embodiment will be described.

(1) The second hand release determination circuit 82 can determine whether or not the steering wheel 10 is in the hand release state based on the steering angle θs, the steering angular velocity ωs, and the steering angle acceleration αs. That is, the second hand release determination circuit 82 can determine that the steering wheel 10 is in the hand release state in a case where the steering angle θs and the steering angular velocity ωs have different signs and the steering angular velocity ωs and the steering angle acceleration αs have different signs. This enables the second hand release determination circuit 82 to determine that the steering wheel 10 is in the hand release state using only the steering angle θs. In this case, the second hand release determination circuit 82 also takes into account not only work applied to the steering wheel 10 by the driver but also work applied to the steering wheel 10 by the assist torque. That is, whether the energy of the steering wheel 10 and the like is converging or diverging can be determined based on the relationship between the signs of the steering angle θs, the steering angular velocity ωs, and the steering angle acceleration αs. Thus, the driver operating state of the steering wheel 10 (whether or not the steering wheel 10 is in the hand release state) can be more adequately determined.

(2) The second hand release determination circuit 82 can determine whether the steering wheel 10 is in the turning steering state, in the hand release state, or in the turn-back steering state by determining whether or not the steering angle θs and the steering angular velocity ωs have the same sign. That is, the second hand release determination circuit 82 can determine that the steering wheel 10 is in the turning steering state when the steering angle θs and the steering angular velocity ωs have the same sign.

The second hand release determination circuit 82 can also determine whether the steering wheel 10 is in the turn-back state or in the hand release state by determining whether or not the steering angular velocity ωs and the steering angle acceleration αs have the same sign. That is, the second hand release determination circuit 82 can determine that the steering wheel 10 is in the turn-back steering state when the steering angular velocity ωs and the steering angle acceleration αs have the same sign. The second hand release determination circuit 82 can also determine that the steering wheel 10 is in the turn-back steering state when the steering angular velocity ωs and the steering angle acceleration αs have different signs. Thus, the second hand release determination circuit 82 can determine whether the steering wheel 10 is in, among other steering states, the turning steering state or the turn-back steering state.

(3) The first hand release determination circuit 81 can determine whether or not the steering wheel 10 is in the hand release state based on whether or not the steering torque Th is larger than the threshold. That is, the first hand release determination circuit 81 can determine that the steering wheel 10 is not in the hand release state (the steering wheel 10 is in the steering state or in the hold state) when the steering torque Th is larger than the threshold. The use of both the first hand release determination circuit 81 and the second hand release determination circuit 82 allows determination of whether or not the steering wheel 10 is in the hand release state, with detection accuracy enhanced. When the first hand release determination circuit 81 determines that the steering wheel 10 is not in the hand release state, opting to omit the determination performed by the second hand release determination circuit 82 is possible. This enables whether or not the steering wheel 10 is in the hand release state to be determined by easier determination processing including only comparison between the steering torque Th and the threshold.

(4) Since the hand release determination circuit 80 determines the hand release state, the damping control can be varied between the hand release state and any other steering state. Consequently, the damping control can be more suitably performed according to the driver's situation. For example, when the steering wheel 10 is in the hand release state (the driver is laying his/her hands on the steering wheel 10 but applying substantially no torque to the steering wheel 10), the driver's steering feeling need not substantially be taken into account. Thus, the effect on the assist torque can be reduced by stopping the damping control circuit or decreasing the damping control amount output from the damping control circuit.

(5) Since the hand release determination circuit 80 determines the hand release state, the hysteresis control can be varied between the hand release state and any other steering state. In the hysteresis control, a middle point of the hysteresis characteristic is set for each of the points of change for the turning steering and the turn-back steering. However, since the assist torque having the hysteresis characteristic is applied with reference to the middle point, the middle point does not necessarily coincide with the actual neutral point of the steering wheel 10. Consequently, even in the hand release state, the hysteresis control prevents the actual neutral point of the steering wheel 10 from coinciding with a point expected by the ECU 40 to be the neutral point. This results in a residual angle that is a difference in steering angle between the actual neutral point and the point expected by the ECU 40 to be the neutral point.

In the present embodiment, the hand release determination circuit 80 determines the hand release state to enable a reduction in the first compensation components calculated by the hysteresis control circuit 90. This enables a reduction in the residual angle resulting from the hysteresis control.

(6) In the conventional technique, the hand release state is determined based on the steering angle θs, the steering angular velocity ωs, and the steering torque Th. In this case, the steering wheel 10 may be determined not to be in the hand release state in an area with small steering angles θs (an area where the steering angle is close to zero). In the present embodiment, even when the steering angle θs is close to zero, the hand release state is determined based on the steering angular velocity ωs and the steering angle acceleration αs. Consequently, the hand release state can be more accurately determined even in an area where the steering angle θs is very small.

Now, a second embodiment of the steering system will be described. The present embodiment is different from the first embodiment in the hand release determination performed by the hand release determination circuit 80. Thus, only the hand release determination method will be described, which is different from the hand release determination method in the first embodiment. The present embodiment may be separately implemented or implemented in combination with the first embodiment to allow the hand release state to be more accurately determined.

Figure 11:
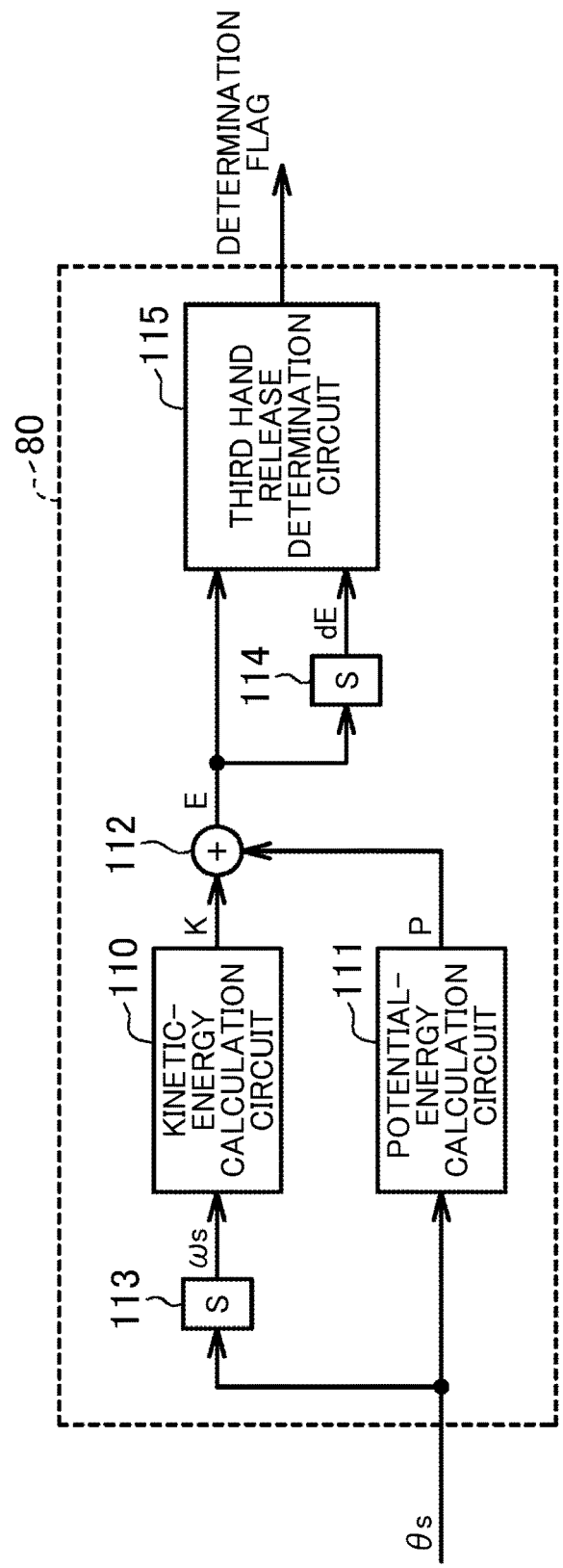
FIG. 11 is a schematic diagram of a hand release determination circuit in a second embodiment.

As illustrated in FIG. 11, the hand release determination circuit 80 has a kinetic-energy calculation circuit 110, a potential-energy calculation circuit 111, an adder 112, differentiators 113, 114, and a third hand release determination circuit 115. By loading the steering torque Th, the hand release determination circuit 80 may perform hand release determination equivalent to the hand release determination executed by the first hand release determination circuit 81. However, this is omitted for simplification of description.

The kinetic-energy calculation circuit 110 calculates kinetic energy K of the steering wheel 10 and the like based on the steering angular velocity ωs calculated by the differentiator 113. The kinetic energy K includes the kinetic energy not only of the steering wheel 10 but also of a portion of the steering shaft 11 coupled to the steering wheel 10 which portion is located above the torsion bar 16. The differentiator 113 calculates the steering angular velocity ωs by differentiating the loaded steering angle θs. The kinetic energy K is expressed by Equation (3) by using the factor of inertia Jh used in Equation (1) as an example of the inertia of the steering wheel 10 and the like.

$$K = (1/2) \cdot Jh \cdot \omega s^2 \qquad (3)$$

The potential-energy calculation circuit 111 calculates potential energy P of the steering wheel 10 and the like based on the steering angle θs. The potential energy P similarly includes the potential energy P not only of the steering wheel 10 but also of a portion of the steering shaft 11 coupled to the steering wheel 10 which portion is located above the torsion bar 16. The potential energy P is energy that is, for example, used by the steering wheel 10 to return to the neutral position when the steering wheel 10 steered to a steering limit is switched to the hand release state. The potential energy P is expressed by Equation (4) by using the viscosity coefficient Ch used in Equation (1) as an example of the viscosity of the steering wheel 10 and the like.

$$P = (1/2) \cdot Ch \cdot \theta s^2 \qquad (4)$$

The adder 112 calculates total energy E by adding the kinetic energy K calculated by the kinetic-energy calculation circuit 110 and the potential energy P together.

The differentiator 114 calculates a total energy variation amount dE by differentiating the total energy E calculated by the adder 112 with respect to time. The third hand release determination circuit 115 generates a determination flag indicating whether or not the steering wheel 10 is in the hand release state, based on the total energy E and the total-energy variation amount dE. The hand release determination method executed by the third hand release determination circuit 115 will be described using a flowchart.

Figure 12:
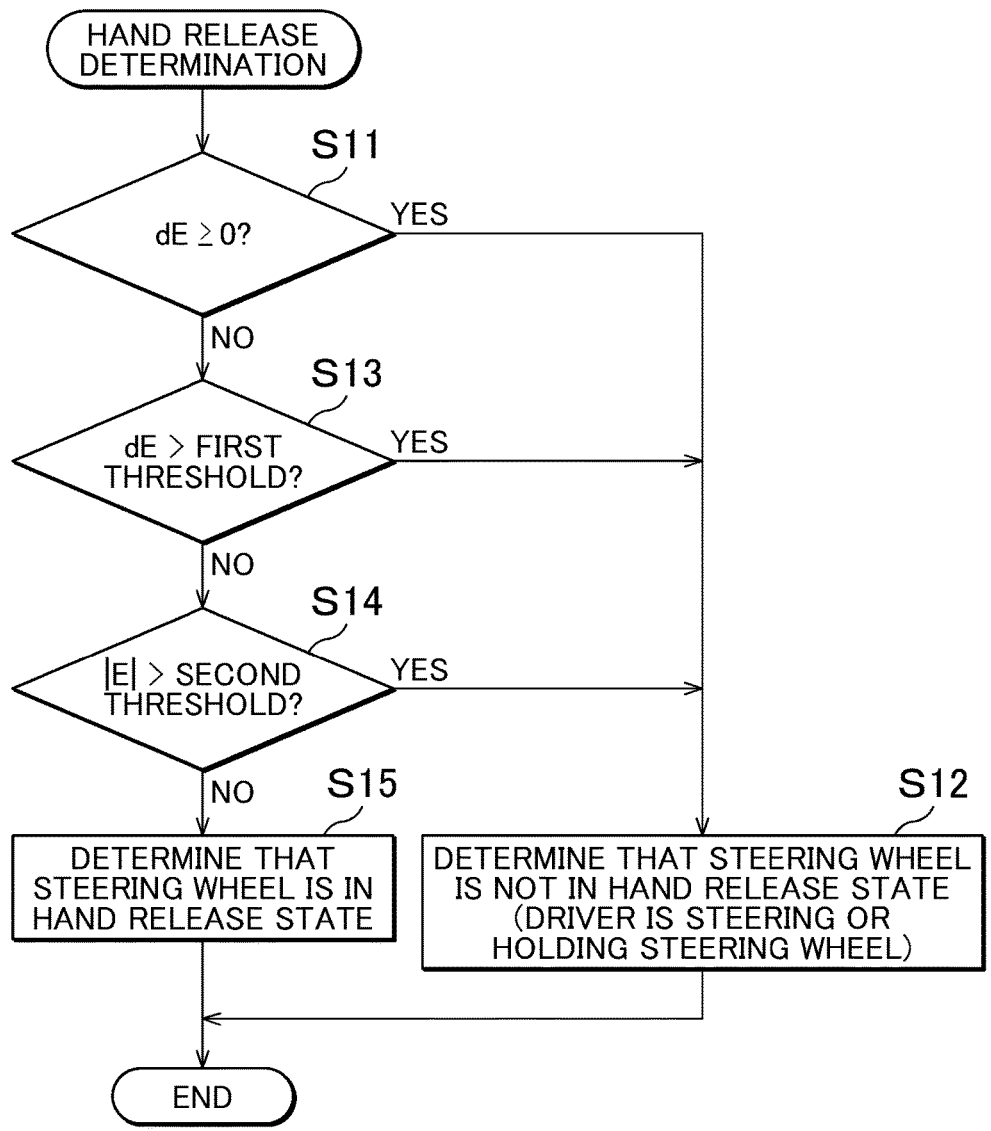
FIG. 12 is a flowchart illustrating a method for hand release determination in the second embodiment.

As illustrated in a flowchart in FIG. 12, first, the hand release determination circuit 80 (third hand release determination circuit 115) determines whether or not the total-energy variation amount dE is equal to or larger than zero (step S11).

When the total-energy variation amount dE is equal to or larger than zero (in step S11, YES), the hand release determination circuit 80 (third hand release determination circuit 115) determines that the steering wheel 10 is not in the hand release state (step S12). This is because the driver is expected to be steering or holding the steering wheel 10.

When the total-energy variation amount dE is smaller than zero (in step S11, NO), the hand release determination circuit 80 (third hand release determination circuit 115) determines whether or not the total-energy variation amount dE is larger than a first threshold (step S13). The first threshold is set to the value of a sufficient amount of variation in the total energy E that is expected to represent the driver's steering, which acts as an external force. When the total-energy variation amount dE is smaller than zero (negative), the total energy E is expected to be decreasing because the steering wheel 10 is in the hand release state, where the driver is not holding the steering wheel 10. In contrast, when the total-energy variation amount dE is larger than zero (positive), the total energy E is expected to be increasing or kept the same because the driver is steering the steering wheel 10.

When the total-energy variation amount dE is larger than a first threshold (in step S13, YES), the hand release determination circuit 80 (third hand release determination circuit 115) determines that the steering wheel 10 is not in the hand release state (step S12).

When the total-energy variation amount dE is smaller than the first threshold (in step S13, NO), the hand release determination circuit 80 (third hand release determination circuit 115) determines whether or not the absolute value of the total energy E is larger than a second threshold (step S14). The second threshold is set to a sufficient value expected to represent a sufficiently high total energy E. This is because the total energy E is expected to be kept sufficiently high due to a steering operation performed by the driver.

When the absolute value of the total energy E is larger than the second threshold (in step S14, YES), the hand release determination circuit 80 (third hand release determination circuit 115) determines that the steering wheel 10 is not in the hand release state (step S12).

When the absolute value of the total energy E is smaller than the second threshold (in step S14, NO), the hand release determination circuit 80 (third hand release determination circuit 115) determines that the steering wheel 10 is in the hand release state (step S15). In this case, the total energy E is expected to be decreasing toward a zero point that is an equilibrium point of the total energy E because the driver is not holding the steering wheel 10.

The third hand release determination circuit 115 outputs the determination flag to the hysteresis control circuit 90 and the damping control circuit 100 based on the determination results concerning whether or not the steering wheel 10 is in the hand release state.

Effects of the present embodiment will be described.

(1) The third hand release determination circuit 115 can determine whether or not the steering wheel 10 is in the hand release state based on the total energy E and the total-energy variation amount dE. That is, the third hand release determination circuit 115 can determine that the steering wheel 10 is in the hand release state in a case where the total-energy variation amount dE is negative, the total-energy variation amount dE is equal to or smaller than the first threshold, and the absolute value of the total energy E is equal to or smaller than the second threshold. This enables the third hand release determination circuit 115 to determine whether or not the steering wheel 10 is in the hand release state, using only the steering angle θs.

The embodiments may be modified as follows. Other embodiments described below may be combined with one another unless the combination is technically inconsistent. In the embodiments, the second assist component is calculated through feedback control using the steered angle θt of the steered wheels 15. However, the invention is not limited to this configuration. For example, as the rotation angle of the rotating shaft that can be converted into the steering angle of the steered wheels 15, a pinion angle may be used which is the rotation angle of the pinion shaft 11c or the rotation angle of the intermediate shaft 11b or the rotating shaft 21 of the motor 20 may be used.

In the embodiments, the compensation control circuit 52 performs the hysteresis control and the damping control. However, the invention is not limited to this configuration. That is, the compensation control circuit 52 may perform at least one of the hysteresis control and the damping control.

In the embodiments, the basic damping control amount Td has a relation with the steering angular velocity ωs in which the absolute value of the basic damping control amount Td increases linearly with the steering angular velocity ωs in the negative direction. However, the invention is not limited to this configuration. That is, the relation between the basic damping control amount Td** and the steering angular velocity ωs is not limited to the linear relation but may be a nonlinear relation.

In the first embodiment, the first hand release determination circuit 81 is provided in the hand release determination circuit 80 but need not be provided. That is, the second hand release determination circuit 82 may exclusively be provided in the hand release determination circuit 80. Furthermore, in the second embodiment, the third hand release determination circuit 115 is provided in the hand release determination circuit 80. However, the invention is not limited to this configuration. That is, in addition to the third hand release determination circuit 115, the first hand release determination circuit 81 may be provided in the hand release determination circuit 80, and the second hand release determination circuit 82 may further be provided in the hand release determination circuit 80.

Figure 10:
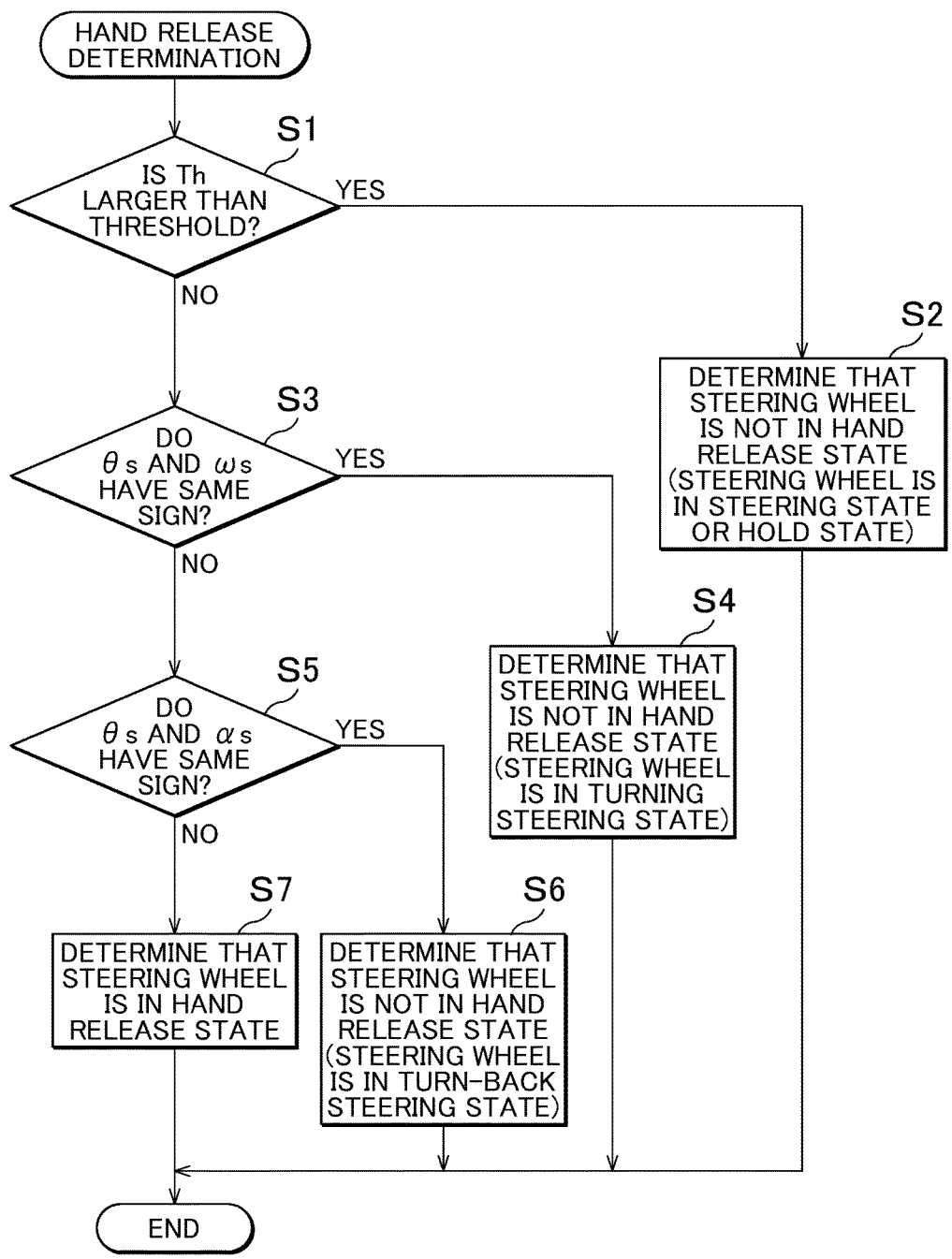
FIG. 10 is a flowchart illustrating a method for hand release determination.

In the first embodiment, when the first hand release determination circuit 81 loads the determination flag indicating that the steering wheel 10 is in the hand release state, the second hand release determination circuit 82 does not perform the hand release determination based on the steering angle θs (see FIG. 10). However, the second hand release determination circuit 82 may perform this hand release determination. That is, when the second hand release determination circuit 82 performs the hand release determination after the first hand release determination circuit 81 performs the hand release determination, the hand release state can be more accurately determined.

In the embodiments, when the determination flag is generated which indicates that the steering wheel 10 is in the hand release state, the hysteresis gain Gh is reduced to decrease the hysteresis control amount Th*. However, the invention is not limited to this configuration. For example, the basic-hysteresis-control-amount calculation circuit 91 may include a plurality of maps allowing the basic hysteresis control amount Th** to be calculated so that the hysteresis control amount Th* can be reduced by switching among the maps based on the determination flag. Also for the damping control, the damping gain Gd is reduced to decrease the damping control amount Td*. However, the invention is not limited to this configuration.

In the embodiments, the steering angular velocity ωs is calculated by differentiating the steering angle θs with respect to time. However, the invention is not limited to this configuration. For example, variation in the steering angle θs per unit time may be calculated to allow the steering angular velocity ωs, which is the amount of variation in the steering angle θs, to be calculated without differentiation of the steering angle θs. The steering angle acceleration αs, which is the amount of variation in the steering angular velocity ωs, may also be calculated without differentiation of the steering angular velocity ωs.

In the embodiments, the hysteresis gain Gh and the damping gain Gd are gradually reduced or increased. However, the invention is not limited to this configuration. That is, if a rapid change in the hysteresis gain Gh and the damping gain Gd poses no problem, the gradual reduction or increase need not be executed.

In the embodiments, the steered-angle calculation circuit 56 detects the steered angle θt based on the rotation angle θm of the motor 20 detected by the rotation angle sensor 31. However, the invention is not limited to this configuration. For example, a sensor that measures the steered angle θt may be provided to measure the steered angle θt.

In the embodiments, the adder 53 is provided in the assist command value calculation circuit 43. However, a subtractor may be provided in the assist command value calculation circuit 43. If a subtractor is provided instead of the adder 53, the positive and negative signs of the hysteresis control amount Th* and the damping control amount Td* are reversed.

In the embodiments, the ECU 40 is provided with no phase compensation control circuit. However, a phase compensation control circuit may be provided in the ECU 40. In this case, a compensated steering torque is input to the basic assist control circuit 51. In the embodiments, the steered-angle feedback control circuit 55 calculates the second assist component Ta2*. However, the second assist component Ta2* need not be calculated. In this case, the steered-angle command value calculation circuit 54 and the steered-angle feedback control circuit 55 need not be provided, and the first assist component Ta1* is equal to the assist command value Ta*.

In the embodiments, the invention is embodied in the column assist EPS 1. However, the invention is not limited to this configuration. For example, the invention may be embodied in a pinion assist EPS or a rack assist EPS. The electric power steering system has been described by way of example which assists the linear motion of the rack shaft 12 interlocked with the steering operation, utilizing the rotational force of the motor 20. However, the invention may be embodied in a steer-by-wire (SBW) system or in a rear-wheel steering system or a four-wheel steering system.

What is claimed is:

1. A steering control apparatus that controls a power transmission apparatus that applies power to a steering mechanism using a motor as a driving source, based on a command value serving as a target value for the power, the steering control apparatus comprising:
    a basic assist control circuit that calculates a basic component of the command value based on a steering torque applied to a steering shaft of the steering mechanism;
    a compensation control circuit that calculates a first compensation component for the basic component based on a steering angle that is a rotation angle of the steering shaft of the steering mechanism or a rotation angle of a rotating element that is convertible into the steering angle; and
    a determination circuit that determines whether or not the driver's steering state corresponds to a hand release state based on the steering angle and a steering angular velocity that is an amount of variation in the rotation angle per unit time, wherein,
    the determination circuit determines that the steering state does not correspond to the hand release state when the steering angle is equal in sign to the steering angular velocity.

2. The steering control apparatus according to claim 1, further comprising:
    a steered-angle feedback control circuit that calculates a second compensation component for the basic component by calculating a steered-angle command value serving as a base for the command value based on the steering torque, the basic component, and the first compensation component and by performing angle feedback control based on the steered-angle command value; and
    an adder that calculates the command value by adding the second compensation component to a value calculated based on the basic component and the first compensation component.

3. The steering control apparatus according to claim 1, wherein,
    the determination circuit determines that the steering state corresponds to the hand release state based on a steering angle acceleration that is an amount of variation in the steering angular velocity per unit time in addition to the steering angle and the steering angular velocity.

4. The steering control apparatus according to claim 1, wherein,
    the determination circuit determines that the steering state corresponds to the hand release state when the steering angular velocity is different in sign from a steering angle acceleration that is an amount of variation in the steering angular velocity per unit time.

5. The steering control apparatus according to claim 1, wherein,
    the determination circuit determines that the steering state corresponds to a turning steering state when the steering angle is equal in sign to the steering angular velocity,
    determines that the steering state corresponds to a turn-back state in a case where the steering angle is different in sign from the steering angular velocity and the steering angular velocity is equal in sign to the steering angle acceleration that is the amount of variation in the steering angular velocity per unit time, and determines that the steering state corresponds to the hand release state in a case where the steering angle is different in sign from the steering angular velocity and the steering angular velocity is different in sign from the steering angle acceleration.

6. The steering control apparatus according to claim 1, wherein,
the determination circuit calculates total energy that is a sum of kinetic energy of a steering wheel calculated based on the steering angular velocity and potential energy of the steering wheel calculated based on the steering angle, and determines whether or not the steering state corresponds to the hand release state, based on the total energy.

7. The steering control apparatus according to claim 1, wherein,
the determination circuit calculates the total energy that is the sum of the kinetic energy of the steering wheel calculated based on the steering angular velocity and the potential energy of the steering wheel calculated based on the steering angle, and determines that the steering state does not correspond to the hand release state when the total energy is larger than a threshold.

8. The steering control apparatus according to claim 1, wherein,
the determination circuit calculates the total energy that is the sum of the kinetic energy of the steering wheel calculated based on the steering angular velocity and the potential energy of the steering wheel calculated based on the steering angle, and determines that the steering state corresponds to the hand release state when an amount of variation in the total energy with respect to time is smaller than zero.

9. The steering control apparatus according to claim 1, wherein,
the determination circuit determines that the steering state does not correspond to the hand release state when the steering torque is larger than a threshold, and determines that the steering state corresponds to the hand release state when the steering torque is smaller than the threshold.

10. The steering control apparatus according to claim 1, wherein,
the first compensation component calculated by the compensation control circuit is compensated for based on a determination result for the hand release state produced by the determination circuit.

11. The steering control apparatus according to claim 1, wherein,
the compensation control circuit includes a hysteresis control circuit that calculates, as the first compensation component, a hysteresis control amount having a hysteresis characteristic for the steering angle, and
when the determination circuit determines that the steering state corresponds to the hand release state, the hysteresis control amount is reduced.

12. The steering control apparatus according to claim 1, wherein,
the compensation control circuit includes a damping control circuit that calculates, as the first compensation component, a damping control amount calculated based on the steering angular velocity so as to reduce a rapid change in the steering angle, and
when the determination circuit determines that the steering state corresponds to the hand release state, the damping control amount is changed.

13. A steering control apparatus that controls a power transmission apparatus that applies power to a steering mechanism using a motor as a driving source, based on a command value serving as a target value for the power, the steering control apparatus comprising:
a basic assist control circuit that calculates a basic component of the command value based on a steering torque applied to a steering shaft of the steering mechanism;
a compensation control circuit that calculates a first compensation component for the basic component based on a steering angle that is a rotation angle of the steering shaft of the steering mechanism or a rotation angle of a rotating element that is convertible into the steering angle; and
a determination circuit that determines whether or not the driver's steering state corresponds to a hand release state based on the steering angle and a steering angular velocity that is an amount of variation in the rotation angle per unit time, wherein,
the determination circuit determines that the steering state corresponds to the hand release state based on a steering angle acceleration that is an amount of variation in the steering angular velocity per unit time in addition to the steering angle and the steering angular velocity.

14. A steering control apparatus that controls a power transmission apparatus that applies power to a steering mechanism using a motor as a driving source, based on a command value serving as a target value for the power, the steering control apparatus comprising:
a basic assist control circuit that calculates a basic component of the command value based on a steering torque applied to a steering shaft of the steering mechanism;
a compensation control circuit that calculates a first compensation component for the basic component based on a steering angle that is a rotation angle of the steering shaft of the steering mechanism or a rotation angle of a rotating element that is convertible into the steering angle; and
a determination circuit that determines whether or not the driver's steering state corresponds to a hand release state based on the steering angle and a steering angular velocity that is an amount of variation in the rotation angle per unit time, wherein,
the determination circuit determines that the steering state corresponds to the hand release state when the steering angular velocity is different in sign from a steering angle acceleration that is an amount of variation in the steering angular velocity per unit time.

\* \* \* \* \*